US009171045B2

(12) United States Patent
Mishra et al.

(10) Patent No.: US 9,171,045 B2
(45) Date of Patent: Oct. 27, 2015

(54) RECOMMENDING QUERIES ACCORDING TO MAPPING OF QUERY COMMUNITIES

(75) Inventors: Nina Mishra, Pleasanton, CA (US);
Sreenivas Gollapudi, Cupertino, CA (US); Srikanth Jagabathula, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 537 days.

(21) Appl. No.: 12/943,951

(22) Filed: Nov. 11, 2010

(65) Prior Publication Data
US 2012/0124070 A1 May 17, 2012

(51) Int. Cl.
*G06F 17/30* (2006.01)
(52) U.S. Cl.
CPC ...... *G06F 17/30528* (2013.01); *G06F 17/3097* (2013.01)
(58) Field of Classification Search
CPC .................................................. G06F 17/3097
See application file for complete search history.

(56) References Cited

U.S. PATENT DOCUMENTS

| 6,169,986 | B1 | 1/2001 | Bowman et al. | |
|---|---|---|---|---|
| 2006/0173822 | A1* | 8/2006 | Watson et al. | 707/3 |
| 2008/0065624 | A1* | 3/2008 | Sun et al. | 707/5 |
| 2008/0154877 | A1* | 6/2008 | Joshi et al. | 707/5 |
| 2010/0169316 | A1 | 7/2010 | Gehlot et al. | |
| 2010/0179956 | A1 | 7/2010 | Jammalamadaka et al. | |

OTHER PUBLICATIONS

Doug Beeferman and Adam Berger. 2000. Agglomerative clustering of a search engine query log. In Proceedings of the sixth ACM SIGKDD international conference on Knowledge discovery and data mining (KDD '00). ACM, New York, NY, USA, 407-416. DOI=10.1145/347090.347176 http://doi.acm.org/10.1145/347090.347176.*
Baeza-Yates et al. Extracting Semantic Relations from Query Logs. 2007. http://www.ics.uci.edu/~smyth/courses/cs277/papers/query_term_relations_KDD2007_p76-baeza-yates.pdf.*
Dai et al. Detecting Online Commercial Intention (OCI). 2006. http://research.microsoft.com/en-us/um/people/znie/www2006-oci.pdf.*

(Continued)

*Primary Examiner* — Syed Hasan
(74) *Attorney, Agent, or Firm* — Micah Goldsmith; Judy Yee; Micky Minhas

(57) ABSTRACT

A set of queries, such as a search log, is divided into commercial queries and non-commercial queries. A first set of query communities is determined from the non-commercial queries and a second set is determined from the commercial queries. The query communities are correlated based on the users who submitted the queries and instances where a query from the first set of query communities was followed by a query from the second set to generate a mapping between the first set of query communities and the second set. Later, a non-commercial query is received from a user, and the mapping is used to predict one or more commercial queries that the user is likely to submit in the future based on the non-commercial query. One or more of the commercial queries are presented to the user according to the mapping with search results responsive to the non-commercial query.

17 Claims, 6 Drawing Sheets

(56) References Cited

OTHER PUBLICATIONS

Fonseca, et al., "Concept Based Interactive Query Expansion", Retrieved at << http://citeseerx.ist.psu.edu/viewdoc/download?doi=10.1.1.85.5307&rep=rep1&type=pdf >>, Conference on Information and Knowledge Management, Oct. 31-Nov. 5, 2005, pp. 8.

Haav, et al., "A Survey of Concept-based Information Retrieval Tools on the Web", Retrieved at << www.science.mii.lt/ADBIS/local2/haav.pdf >>, 5th East-European Conference, ADBIS, 2001, pp. 11.

Dai, et al., "Detecting Online Commercial Intention (OCI)", Retrieved at << http://www2006.org/programme/files/xhtml/6016/6016-dai-xhtml.html >>, The 15th International World Wide Web Conference, May 22-26, 2006, pp. 18.

Cao, et al., "Context-Aware Query Suggestion by Mining Click-Through and Session Data", Retrieved at << http://0-www.cs.sfu.ca.library.ucc.ie/~jpei/publications/QuerySuggestion-KDD08.pdf >>, The 14th ACM SIGKDD International Conference on Knowledge Discovery and Data Mining, Aug. 24-27, 2008, pp. 9.

Li, et al., "Learning Query Intent from Regularized Click Graphs", Retrieved at << http://research.microsoft.com/pubs/75219/sigir2008.pdf >>, The 31st Annual International ACM SIGIR Conference, Jul. 20-24, 2008, pp. 8.

Cao, et al., "Towards Context-Aware Search by Learning a Very Large Variable Length Hidden Markov Model from Search Logs", Retrieved at << http://research.microsoft.com/en-us/people/hangli/cao-etal-www2009.pdf >>, The 18th International World Wide Web Conference, Apr. 20-24, 2009, pp. 191-200.

Saad, Sharhida Zawani, "Web Personalization based on Usage Mining", Retrieved at << http://www.dcs.gla.ac.uk/~leif/papers/fdia2009proceedings.pdf >>, Third BCS-IRSG Symposium on Future Directions in Information Access (FDIA), Sep. 1, 2009, pp. 148.

Achlioptas, et al., "Fast Computation of Low Rank Matrix Approximations", Retrieved at << http://citeseerx.ist.psu.edu/viewdoc/download?doi=10.1.1.21.9100&rep=rep1&type=pdf >>, 33rd ACM Symposium on Theory of Computing, Jul. 6-8, 2001, pp. 15.

Bell, et al., "Modeling Relationships at Multiple Scales to Improve Accuracy of Large Recommender Systems", Retrieved at << http://public.research.att.com/~volinsky/netflix/NetflixKDD07.pdf >>, The 13th ACM SIGKDD International Conference on Knowledge Discovery and Data Mining, Aug. 12-15, 2007, pp. 95-104.

Boldi, et al., "The Query-Flow Graph: Model and Applications", Retrieved at << http://vigna.dsi.unimi.it/ftp/papers/QueryFlowGraph.pdf >>, Conference on Information and Knowledge Management, Oct. 26-30, 2008, pp. 9.

Craswell, et al., "Random Walks on the Click Graph", Retrieved at << http://research.microsoft.com/en-us/um/people/nickcr/pubs/craswell_sigir07.pdf >>, The 30th Annual International SIGIR Conference, Jul. 23-27, 2007, pp. 8.

Frey, et al., "Copulas and Credit Models", Retrieved at << http://www.mathematik.uni-leipzig.de/~frey/copula-credit.pdf >>, Oct. 2001, pp. 1-8.

Fuxman, et al., "Improving Classification Accuracy Using Automatically Extracted Training Data", Retrieved at << http://research.microsoft.com/pubs/80763/CommerceIntent_KDD09.pdf >>, The 15th ACM SIGKDD International Conference on Knowledge Discovery and Data Mining, Jun. 28-Jul. 1, 2009, pp. 9.

Gupta, et al., "Catching the Drift: Learning Broad Matches from Clickthrough Data", Retrieved at << http://research.microsoft.com/en-us/um/people/mbilenko/papers/09-kdd.pdf >>, The 15th ACM SIGKDD International Conference on Knowledge Discovery and Data Mining, Jun. 28-Jul. 1, 2009, pp. 9.

Hofmann, et al., "Latent Class Models for Collaborative Filtering", Retrieved at << http://citeseerx.ist.psu.edu/viewdoc/download?doi=10.1.1.33.6675&rep=rep1&type=pdf >>, In Proceedings of the Sixteenth International Joint Conference on Artificial Intelligence, 1999, pp. 6.

Joachims, et al., "Evaluating the Accuracy of Implicit Feedback from Clicks and Query Reformulations in Web Search", Retrieved at http://citeseerx.ist.psu.edu/viewdoc/download?doi=10.1.1.147.532&rep=rep1&type=pdf >>, ACM Transactions on Information Systems, vol. 25, No. 2, Apr. 2007, pp. 1-26.

Kleinberg, et al., "Using Mixture Models for Collaborative Filtering", Retrieved at << http://www.cs.cornell.edu/home/kleinber/stoc04-mixture.pdf >>, Proceedings of the thirty-sixth annual ACM symposium on Theory of computing, Symposium of Theory of Computing, Jun. 13-15, 2004, pp. 10.

Korolova, et al., "Releasing Search Queries and Clicks Privately", Retrieved at << http://www2009.eprints.org/18/1/p171.pdf >>, Proceedings of the 18th international conference on World Wide Web, The 18th International World Wide Web Conference, Apr. 20-24, 2009, pp. 171-180.

Linden, et al., "Amazon.com Recommendations: Item-to-Item Collaborative Filtering", Retrieved at << http://ieeexplore.ieee.org/stamp/stamp.jsp?tp=&arnumber=1167344 >>, Internet Computing, vol. 7, No. 1, 2003, pp. 5.

McSherry, et al., "Differentially Private Recommender Systems: Building Privacy into the Net", Retrieved at << http://research.microsoft.com/pubs/80511/NetflixPrivacy.pdf >>, Proceedings of the 15th ACM SIGKDD international conference on Knowledge discovery and data mining, The 15th ACM SIGKDD International Conference on Knowledge Discovery and Data Mining, Jun. 28-Jul. 1, 2009, pp. 9.

Mei, et al., "Query Suggestion Using Hitting Time", Retrieved at << http://research.microsoft.com/en-us/um/people/denzho/papers/sugg.pdf >>, Proceeding of the 17th ACM conference on Information and knowledge management, Conference on Information and Knowledge Management, Oct. 26-30, 2008, pp. 9.

Mishra, et al., "Finding Strongly Knit Clusters in Social Networks", Retrieved at << http://www.eecs.berkeley.edu/~isabelle/papers/IMJournalClusteringSocialNetworks.pdf >>, Internet Mathematics, vol. 5, No. 1, 2008, pp. 1-20.

Resnick, et al., "Grouplens: An Open Architecture for Collaborative Filtering of Netnews", Retrieved at << http://www.emunix.emich.edu/~sverdlik/KarlsruheIR/MovieLens.pdf >>, Proceedings of the 1994 ACM conference on Computer supported cooperative work, Computer-Supported Cooperative Work, Oct. 22-26, 1994, pp. 175-186.

Richardson, Matthew., "Learning about the World through Long-Term Query Logs", Retrieved at << http://research.microsoft.com/pubs/78636/a21-richardson.pdf >>, ACM Transactions on the Web, vol. 2, No. 4, Oct. 2008, pp. 21-21:27.

Ron, et al., "The Power of Amnesia: Learning Probabilistic Automata with Variable Memory Length", Retrieved at << http://citeseerx.ist.psu.edu/viewdoc/download?doi=10.1.1.33.1845&rep=rep1&type=pdf >>, Machine Learning—Special issue on Colt, vol. 25, No. 2-3, 1996, pp. 1-34.

Ron, et al., "On the Learnability and Usage of Acyclic Probabilistic Finite Automata", Retrieved at http://citeseerx.ist.psu.edu/viewdoc/download?doi=10.1.1.33.2508&rep=rep1&type=pdf >>, Proceedings of the eighth annual conference on Computational learning theory, 8th Annual Conference on Computational Learning Theory, Jul. 5-8, 1995, pp. 30.

Sadikov, et al., "Clustering Query Refinements by User Intent", Retrieved at << http://www.stanford.edu/~esadikov/www2010_paper.pdf >>, Proceedings of the 19th international conference on World Wide Web, The 19th International World Wide Web Conference, Apr. 26-30, 2010, pp. 10.

Sahami, et al., "A Web-Based Kernel Function for Measuring the Similarity of Short Text Snippets", Retrieved at http://www2006.org/programme/files/xhtml/3069/3069-sahami/3069-sahami-xhtml.html >>, Proceedings of the 15th international conference on World Wide, The 15th International World Wide Web Conference, May 22-26, 2006, pp. 2.

Sarwar, et al., "Item-based Collaborative Filtering Recommendation Algorithms", Retrieved at http://citeseerx.ist.psu.edu/viewdoc/download?doi=10.1.1.29.1951&rep=rep1&type=pdf >>, Proceedings of the 10th international conference on World Wide Web, Hypermedia Track of the 10th International World Wide Web Conference, May 1-5, 2001, pp. 1-15.-

(56) References Cited

OTHER PUBLICATIONS

Stern, et al., "Matchbox: Large Scale Online Bayesian Recommendations", Retrieved at << http://www2009.org/proceedings/pdf/p111.pdf >>, Proceedings of the 18th international conference on World wide web, The 18th International World Wide Web Conference, Apr. 20-24, 2009, pp. 111-120.

Yi, et al., "Query Clustering Using Click-Through Graph", Retrieved at << http://www2009.eprints.org/108/1/p1055.pdf >>, Proceedings of the 18th international conference on World wide web, The 18th International World Wide Web Conference, Apr. 20-24, 2009, pp. 1055-1056.

* cited by examiner

RECOMMENDING QUERIES ACCORDING TO MAPPING OF QUERY COMMUNITIES

BACKGROUND

Many search engines are configured to recommend products or services to a user based on a query submitted by a user. For example, a user may submit the query "digital camera" to the search engine, and may be presented with links to reviews of digital cameras and/or links to websites where the user may purchase the digital camera. These links may be sponsored and/or non-sponsored.

In the above example, recommending digital cameras to the user based on the query is relatively simple because the commercial intent of the query "digital camera" is apparent based on the query itself. In contrast, for some queries, determining a possible commercial intent from the query may be more difficult. For example, consider the query "Mayan Riviera". The query does not have an immediately recognizable commercial intent like "digital camera", but may instead be related to an information gathering session for the user related to an upcoming vacation. Thus, appropriate product recommendations may be for sun block, beach shoes, sunglasses, or other vacation related items. However, because the commercial intent of the query is not easily discernable based on the terms of the query, the products are not recommended to the user, resulting in potential loss or revenue and a degraded search experience for the user.

SUMMARY

A set of queries, such as a search log, is divided into commercial queries and non-commercial queries. A first set of query communities is determined from the non-commercial queries and a second set of query communities is determined from the commercial queries. The first and second sets of query communities are correlated based on the relatedness of the queries to generate a mapping between the first set of query communities (i.e., non-commercial queries) and the second set of query communities (i.e., commercial queries). At a later time, a non-commercial query is received from a user, and the mapping is used to predict one or more commercial queries that the user is likely to submit in the future based on the non-commercial query. One or more of the commercial queries are presented to the user according to the mapping along with search results responsive to the non-commercial query.

In an implementation, a set of queries is received at a computing device through a network. Each query is associated with a user who provided the query and each query has an associated time. A first set of query communities is determined from the set of queries and a second set of query communities is determined from the set of queries by the computing device. Each query community includes at least one query, and each query in a query community is related to every other query in the query community. A set of mappings of query communities from the first set of query communities to query communities from the second set of query communities is determined according to the users and times associated with the queries in the query communities. A query from the first set of query communities is received, and one or more queries from the second set of query communities are recommended based on the mapping.

Implementations may include some or all of the following features. One or more of the queries in the determined query community from the second set of query communities may be presented to the user. The set of queries may be divided into a set of commercial queries and a set of non-commercial queries, and generating the first set of query communities from the set of queries and the second set of query communities from the set of queries may include generating the first set of query communities from the set of non-commercial queries and generating the second set of query communities from the set of commercial queries. A product taxonomy may be received, and the second set of query communities may be generated from the set of commercial queries based on the product taxonomy. Each query community in the second set of query communities may correspond to a product category.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
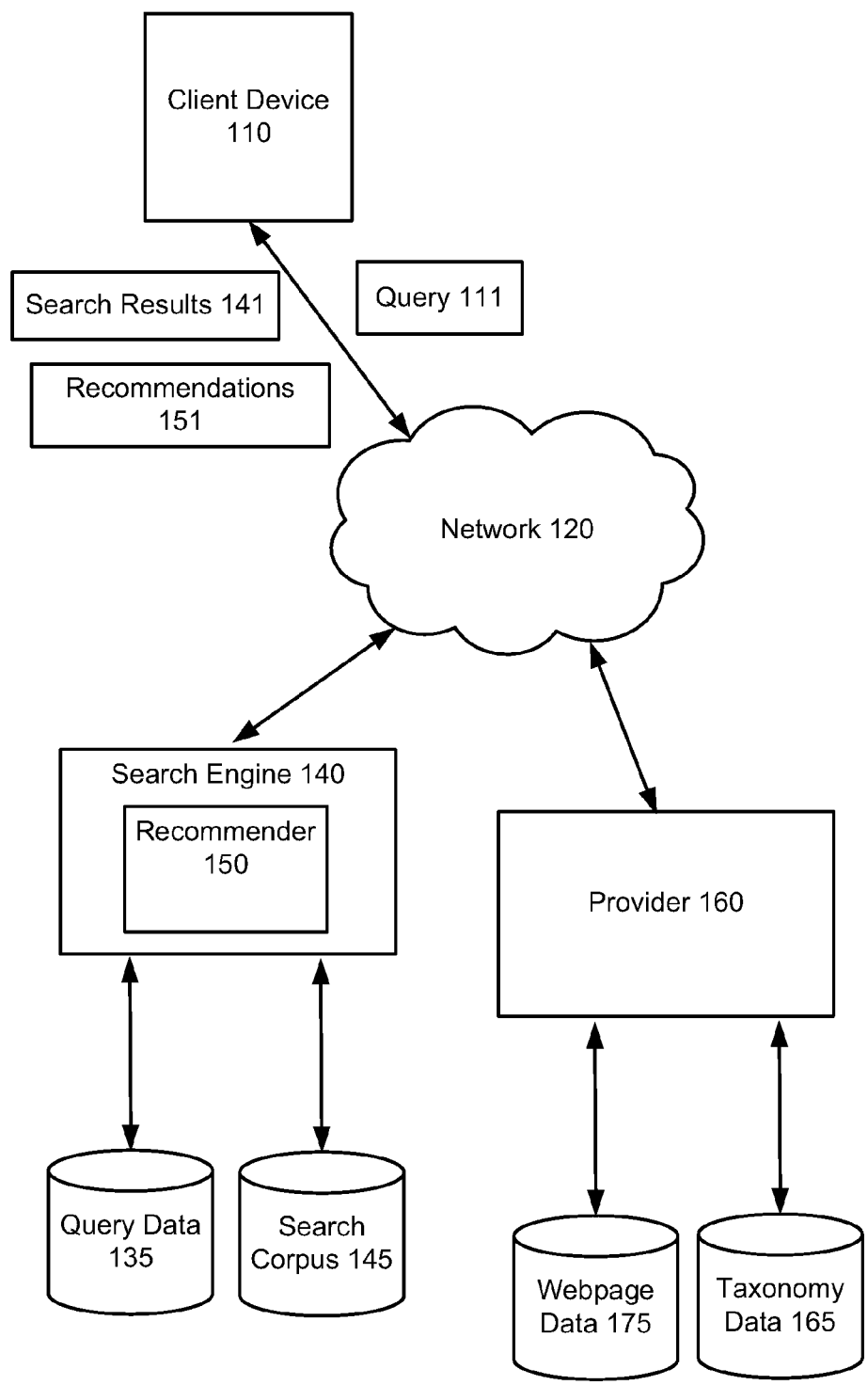
FIG. 1 is an illustration of an example environment for recommending one or more queries based on a query submitted by a user.

FIG. 1 is an illustration of an example environment 100 for recommending one or more queries based on a query submitted by a user. A client device 110 may communicate with one or more search engines 140 or providers 160 through a network 120. The client device 110 may be configured to communicate with the providers 160 and search engines 140 to access, receive, retrieve, and display media content and other information such as webpages. The network 120 may be a variety of network types including the public switched telephone network (PSTN), a cellular telephone network, and a packet switched network (e.g., the Internet), for example.

In some implementations, the client device 110 may include a desktop personal computer (PC), workstation, laptop, personal digital assistant (PDA), cell phone, or any WAP-enabled device or any other computing device capable of interfacing directly or indirectly with the network 120. The client device 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client device 110 to access, process and view information and pages available to it from the search engine 140. The client device 110 may be implemented using a general purpose computing device such as the computing device 600 illustrated in FIG. 6, for example.

The provider 160 may be configured to provide webpages responsive to requests received from users using devices such as the client device 110. The webpages may be stored as webpage data 175. The provider 160 may also allows users to search for, view, and purchase a variety of products or services through one or more webpages associated with various products and services. For example, the provider 160 may be associated with an electronics retailer and users may browse and search for electronics available for sale by providing queries to the provider 160. The provider 160 may return a set of webpage identifiers of webpages stored in the webpage data 175. In addition, the provider 160 may store a classification or taxonomy of the available products and/or services as taxonomy data 165.

The search engine 140 may be configured to receive queries, such as a query 111, from users using clients such as the client device 110. The search engine 140 may search for media responsive to the query 111 by searching a search corpus 145 using the received query. The search corpus 145 may comprise an index of media such as webpages (e.g., webpages from the provider 160), product descriptions, image data, video data, map data, etc. The search engine 140 may generate and return search results 141 to the client device 110 using the search corpus 145. The results 141 may comprise a webpage and may include links to some or all of the media that is responsive to the query 111.

In some implementations, the search engine 140 may store some or all of the queries that it receives over a period of time as query data 135. The stored query data 135 may include a list or set of received queries along with a time that they were received and some indicator of a user associated with the query. In an implementation, the queries may be ordered based on the time they were received by the search engine 140. For example, the indicator may include a unique user name associated with the user, or some other identifier such as a cookie id associated with the user or an IP address associated with the user. Further, while not illustrated, a provider 160 may also collect and store query data 135 based on queries received by the provider 160, for example.

The environment 100 may further include a recommender 150. The recommender 150 may recommend one or more alternative queries to a user based on the query 111. The recommended queries are referred to in FIG. 1 as the recommendations 151. The recommendations 151 may be provided to the user along with the results 141. While the recommender 150 is illustrated as part of the search engine 140, it is contemplated that the recommender 150 may also be implemented separately from the search engine 140 or as part of the provider 160, for example.

The queries that are comprised within the recommendations 151 may be generated from the received query 111 and the history of previously received queries as stored in the query data 135. In particular, the recommendations 151 may be generated according to the sequences of queries posed by users as evidenced by the query data 135.

For example, the query data 135 may show that users who search for a query such as "Mayan Riviera" later submit queries such as "underwater camera" and "suntan lotions". Thus, the recommender 150 may generate recommendations 151 including the queries "underwater camera" and "suntan lotions" when a user submits the query 111 "Mayan Riviera". By providing recommendations 151 corresponding to the queries that the user is likely to later submit, the user may be encouraged to extend their search session by selecting one or more of the queries in the recommendations 151.

In some implementations, the queries in the recommendations 151 are referred to herein as commercial queries. A commercial query is a query that has a readily discernable commercial intent. Typical commercial queries include products or service categories, or names of specific products or services that may be purchased from a provider 160. For example, the queries "underwater camera", "sunscreen", "Sony television", and "42 inch plasma" all have an easily discernable commercial intent and are therefore commercial queries.

In contrast, a non-commercial query is a query that does not have a readily discernable commercial intent. Examples, of non-commercial queries may include "Mayan Riviera", "French Alps", and "fettuccini alfredo".

In some implementations, the recommender 150 may receive a non-commercial query and generate recommendations 151 that include one or more commercial queries. For example, the recommender 150 may receive the non-commercial query "French Alps". Based on the queries, previously submitted by users, in the query data 135, the recommender 150 may determine that users who submit the non-commercial query "French Alps" often later submit the commercial queries "English-to-French translation book", "travel adaptor", and "alps guidebook". The determined commercial queries may then be provided in the recommendations 151.

In some implementations, the recommendations 151 may be provided along with, or as part of, the search results 141. For example, the results 141 may comprise a webpage that includes the links that were responsive to the query 111, and the recommendations 151 may be included in the webpage in a section marked "related queries", or "other users who submitted the same query as you later submitted the following queries".

In addition, along with the recommendations 151, there may be some indicator of the reliability of each query in the recommendations 151 or some other justification for the queries. In some implementations, a recommended query may be preceded by the frequency with which the recommended query was provided by a user after submitting the same query. For example, a recommended query "underwater camera" for the query "Mayan Riviera" may be followed by "15% of the users who submitted the query "Mayan Riviera" later submitted the query "underwater camera". Such justifications may encourage the user to select one of the recommended queries.

Figure 2:
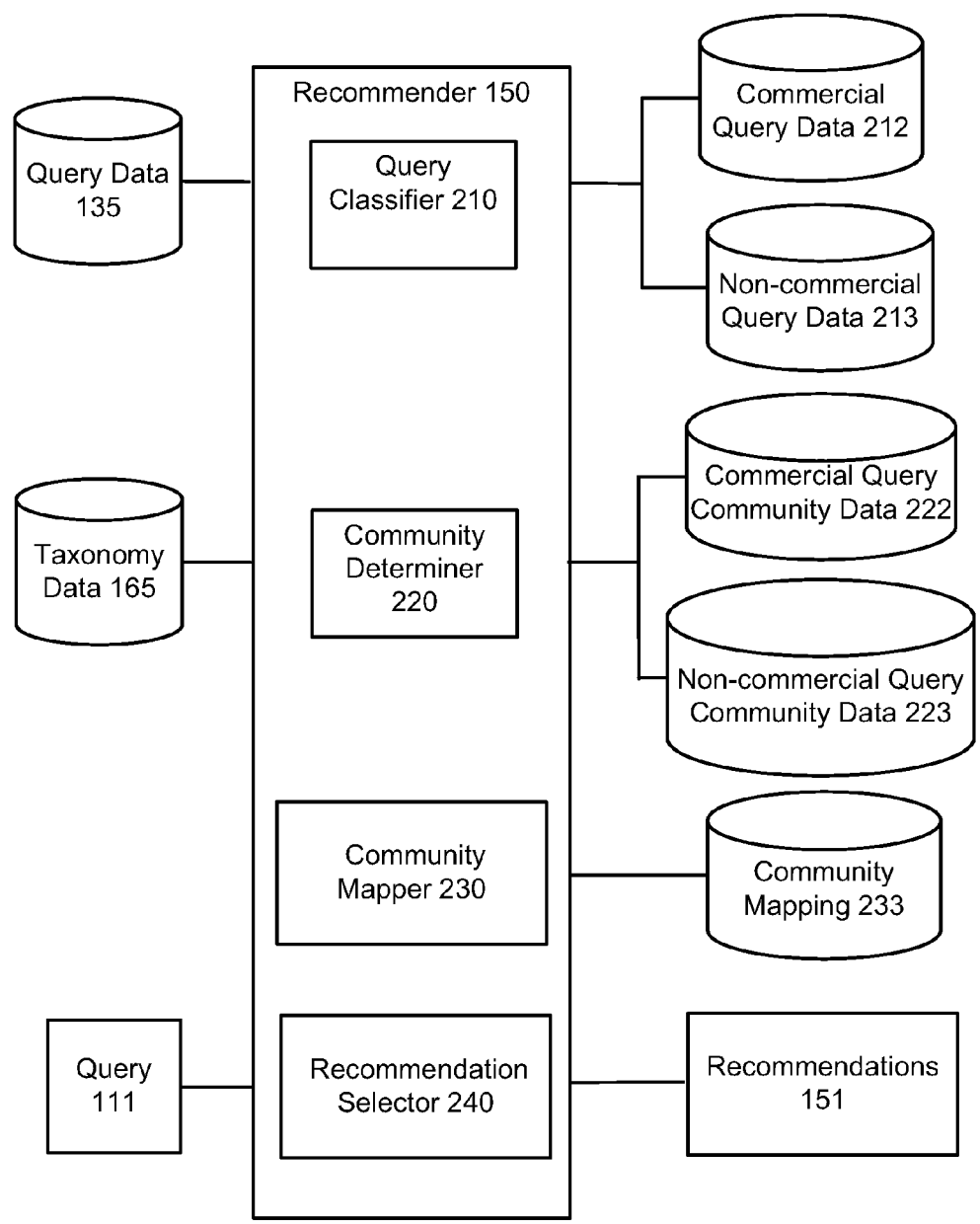
FIG. 2 is an illustration of an example recommender.

FIG. 2 is an illustration of an example recommender, such as the recommender 150. As shown, the recommender 150 may comprise components including, but not limited to, a query classifier 210, a community determiner 220, a community mapper 230, and a recommendation selector 240. While these components are illustrated as part of the recommender 150, each of the various components may be implemented separately from one another using one or more computing devices such as the computing device 600 illustrated in FIG. 6, for example.

The classifier 210 may divide the queries in the query data 135 into a first set of queries and a second set of queries. In some implementations, the first set of queries may be non-commercial queries and the second set of queries may be commercial queries, or vice versa. Other criteria may also be used to separate the set of queries into a first set and a second set of queries. The commercial queries may be stored in the commercial query data 212 and the non-commercial queries may be stored in the non-commercial query data 213, for example.

In some implementations, the commercial queries and the non-commercial queries may be identified by the query classifier 210 using a classifier trained using a set of known commercial queries and a set of known non-commercial queries. For example, the set of known non-commercial queries may be queries that were submitted to a non-commercial website such as Wikipedia, and the set of known commercial queries may be queries that were received by a provider 160 such as Amazon.com or Target.com, for example. In some implementations, the commercial queries may be queries with commercial intent and may be identified using the methods and techniques described in U.S. Patent Publication No. 2009/0228353, the contents of which are hereby incorporated by reference.

The community determiner 220 may generate query communities from the commercial query data 212 and the non-commercial query data 213. A query community may comprise a set of one or more queries where each query in the set is related to each and every other query in the set. The community determiner 220 may generate a first set of query communities from the non-commercial query data 213, and a second set of query communities from the commercial query data 212. The query communities may be determined using any of variety of known methods and techniques of grouping data.

In some implementations, the community determiner 220 may generate the first set of query communities by generating a graph representing the queries in the non-commercial query data 213. The graph may include a vertex for each unique query in the non-commercial query data 213. The community determiner 220 may then generate an edge between each vertex pair that are deemed to be related. One example of related queries are queries that were received from the same user within a set time window more than a threshold number of times. For example, queries that are received from a single user in a short period of time are generally related because the user may have revised an initial query with a new related query. The duration of the set time window and the threshold may be set by a user or administrator, for example.

Other heuristics may be used to determine if two queries are related. For example, if two queries lead to a click on the same webpage, the queries may be related. If two queries are bid on by the same advertiser in a keyword auction, the queries may be related. If two queries serve as anchor text in a HTML document that links to the same document, the queries may be related. If two queries appear in the same snippet text of a search engine, the queries may be related. Other methods may also be used. In some implementations, the snippet data, keyword auction data, and click data may be stored and maintained with the query data 135.

After generating the edges, the community determiner 220 may densify the graph by generating an edge between pairs of vertices that are connected to a threshold number of vertices in common. For example, vertices representing queries that are connected to a large number of common vertices are likely to represent queries that are also related. The threshold may be set by a user or administrator, for example. Other data such as user click data may also be used to generate edges between vertices.

The community determiner 220 may cluster the graph based on the connectedness of the vertices, and may generate communities for the first set of communities from the queries associated with the vertices in each cluster. Any system, method, or technique for clustering a graph may be used. The first set of query communities may be stored as the non-commercial query community data 223.

In some implementations, the community determiner 220 may generate the second set of query communities using the commercial query data 212 and the taxonomy 165. The providers 160 may each store taxonomy data 165. The taxonomy data 165 comprises a categorization or hierarchy of the products or services offered by the providers 160. In some implementations, the community determiner 220 may generate each of the communities in the second set of query communities based on one or more categories in the taxonomy data 165, and may add the commercial queries to the communities corresponding to the categories that the queries belong based on the taxonomy data 165. For example, the taxonomy data 165 may have a category "digital camera" that includes various digital camera models. The community determiner 220 may generate a query community corresponding to the category "digital camera" and may add each commercial query that is a digital camera model to the digital camera query community. The second set of query communities may be stored by the community determiner 220 as the commercial query community data 222.

The community mapper 230 may determine a set of mappings of query communities of the first set of query communities to query communities of the second set of query communities. The set of mappings may map the query communities from the non-commercial query community data 223 to the query communities from commercial query community data 222. The set of mappings may be stored as the community mapping 233 by the community mapper 230.

In some implementations, each mapping in the set of mappings may be generated by what is referred to herein as the co-occurrence method. In one implementation of the co-occurrence method, each unique query community pair from the first set of query communities and the second set of query communities (e.g., the non-commercial query community data 223 and the commercial query community data 222) are determined. For each unique query community pair, a first amount of users who provided a query from the non-commercial query community followed by a query from the commercial query community is determined. Similarly, a second amount of users who provided a query from the commercial query community followed by a query from the non-commercial query community is determined. The determination may be made by the community mapper 230 using the query data 135.

The community mapper 230 may further determine if the first amount is greater than both a threshold amount and the second amount. If so, a mapping from the non-commercial query community to the commercial query community is added to the community mapping 233. The community mapper 230 may repeat this implementation of the co-occurrence method for each unique query community pair from the first set of query communities and the second set of query communities. The threshold amount may be chosen by a user or administrator, for example.

In another implementation of the co-occurrence method, each unique query community pair from the first set of query communities and the second set of query communities are determined. For each unique query community pair, a number of users who provided a query from the non-commercial query community followed by a query from the commercial query community is determined. The community mapper 230 may then determine if the number of users is greater than a threshold amount. If so, a mapping from the non-commercial query community to the commercial query community is added to the community mapping 233. The community mapper 230 may repeat this implementation of co-occurrence method for each unique query community pair from the first set of query communities and the second set of query communities. The threshold amount may be chosen by a user or administrator, for example. This implementation differs from the previous implementation of the co-occurrence method described above in that it does not consider whether the commercial query proceeded the non-commercial query.

In another implementation of the co-occurrence method, each unique query community pair from the first set of query communities and the second set of query communities are determined. For each unique query community pair, determination is made as to whether the two queries co-occur (e.g., are received by the same user). If so, a mapping from the non-commercial query community to the commercial query community is added to the community mapping 233. The community mapper 230 may repeat this implementation of co-occurrence method for each unique query community pair from the first set of query communities and the second set of query communities. This implementation differs from the previous implementations of the co-occurrence method described above in that it does not consider the order that the queries are received in.

In some implementations, each mapping in the set of mappings may be generated by what is referred to herein as the hitting set recommendation method. In the hitting set recommendation method, the method is repeated on each query community in the second set of query communities. For a selected query community from the second set of query communities, the community mapper 230 may determine each query community from the first set of query communities that includes a query that has a user in common with a query from the selected query community from the second set of query communities.

For each determined query community from the first set of query communities, the community mapper 230 may determine a count of each query in the determined query community that has a user in common with a query from the selected query community. If the determined count for a query community is greater than a threshold count, the community mapper 230 may add a mapping from the query community from the first set of query communities to the selected query community from the second set of query communities to the community mapping 233. After adding a mapping, the community mapper 230 may remove the queries from the determined query community from the first set of query communities that have users in common with queries from the selected query community from the second set of query communities. The community mapper 230 may repeat the process for each of the communities in the second set of query communities.

In some implementations, the set of mappings may be generated by what is referred to herein as the random walk method. In the random walk method, a graph is generated with a vertex for each query community from the first set of query communities and a vertex for each query community from the second set of query communities. A directed edge is placed between each vertex representing a query community from the first set of query communities to each vertex representing a query community from the second set of query communities, if the query community from the second set includes a query that was submitted after a query from the query community from the first set by a user. Each edge may be weighted based on the number of such queries in the query community from the second set.

The community mapper 230 may then perform a number of random walks of various lengths on the graph beginning on vertices that represent query communities from the first set, and ending at the end of the walk or when a vertex representing a query community from the second set is reached. A mapping may be added to the community mapping 233 between two query communities if the probability of a random walk originating from the first query community and ending at the second query community is sufficiently high. The threshold probability may be set by a user or administrator, for example.

The recommendation selector 240 may generate recommendations 151 based on a received query 111 and the community mapping 233. When a query 111 is received, the recommendation selector 240 may determine the query community from the first set of query communities that includes the query 111. The recommendation selector may use the community mapping 233 to determine one or more query communities from the second set of query communities that map to the determined query community from the first set of query communities. The recommendation selector 240 may then present one or more queries from each of the determined query communities from the second set of query communities as the recommendations 151. The recommendations 151 may be presented to the user along with one or more results generated by the search engine 140 in response to the query 111, for example.

In some implementations, the recommendation selector 240 may further provide justifications and/or statistics supporting the recommendations presented to the user. For example, each recommended query may be provided with a percentage of users who later submitted the recommended query after submitting the query 111.

Figure 3:
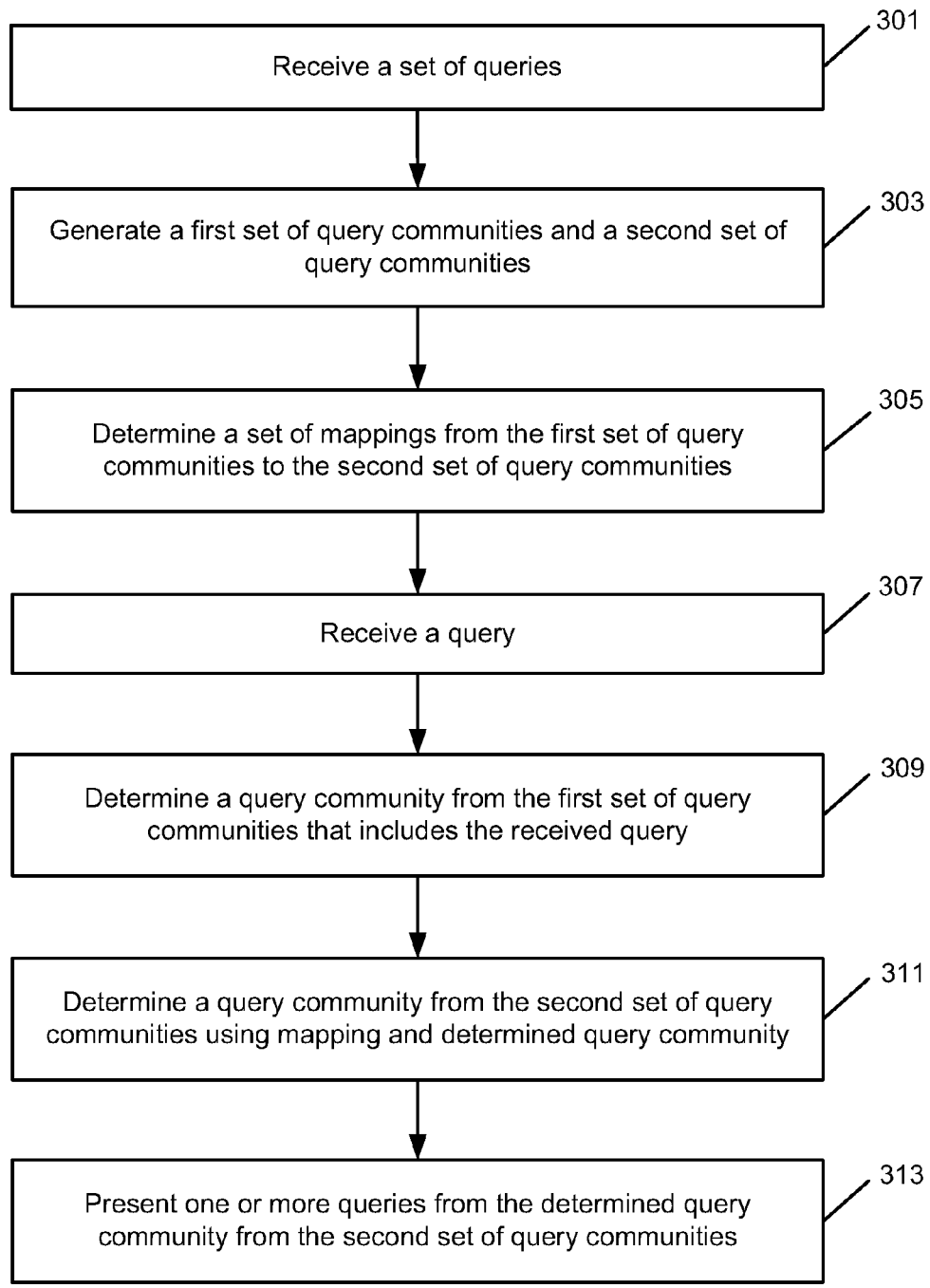
FIG. 3 is an operational flow of an implementation of a method for providing one or more recommended queries to a user based on a user query.

FIG. 3 is an operational flow of an implementation of a method 300 for providing one or more recommended queries to a user based on a user query. The method 300 may be implemented by the recommender 150, for example.

A set of queries is received at 301. The set of queries may be received by the recommender 150. The set of queries may be part of the query data 135 and may comprise a query log, for example. The queries in the set of queries may be each associated with a user and a time. In some implementations, the set of queries may be divided into a first set of commercial queries and a second set of non-commercial queries by the query classifier 210 of the recommender 150.

A first set of query communities and a second set of query communities are generated at 303. The first and second sets of communities may be generated by the community determiner 220 from the set of queries. In some implementations, the first set of query communities may be non-commercial query communities and may be stored as the non-commercial query community data 223. Similarly, the second set of query communities may be commercial query communities and may be stored as the commercial query community data 222. Each query in a query community is related to every other query in the query community, in an implementation.

A set of mappings from the first set of query communities to the second set of query communities is determined at 305. The set of mappings may be determined by the community mapper 230 and stored as the community mapping 233.

A query is received at 307. The query may be received by the recommender 150 and/or the search engine 140, for example. In some implementations, the query may be a non-commercial query and may be received from a user of a client device 110.

A query community in the first set of query communities that includes the received query is determined at 309. The query community may be determined by the recommendation selector 250. The determined query community may be a non-commercial query community.

A query community from the second set of query communities is determined using the set of mappings and the determined query community at 311. The query community may be determined by the recommendation selector 250. The determined query community may be a commercial query community.

One or more recommended queries from the determined query community from the second set of query communities are presented at 313. The one or more queries may be presented by the recommendation selector 250. The one or more queries may be commercial queries and may be presented to the user in a webpage along with one or more search results responsive to the query received at 307. The one or more queries may be selected from the queries in the determined query community from the second set of query communities. The recommended queries may be presented in an area of the webpage labeled "recommended queries" or the like, for example. The recommended queries may be presented along with a justification that explains why the queries were recommended. For example, a percentage of users who submitted the same query as the original and later submitted each recommended query may be determined from the query data 135 and presented along with each recommended query. In some implementations, the recommended queries may be stored in an inverted index.

Figure 4:
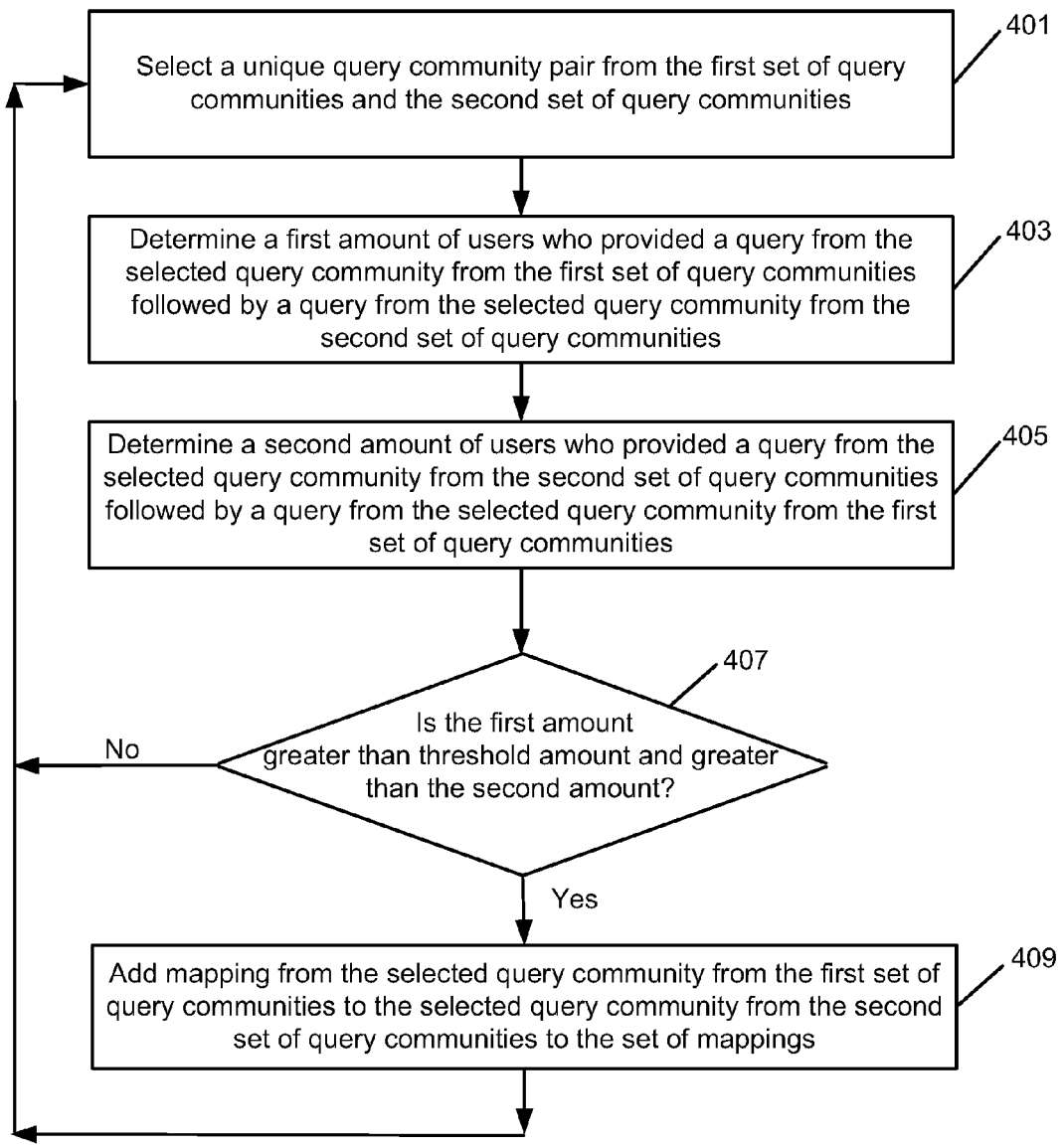
FIG. 4 is an operational flow of an implementation of a method for determining a set of mappings of query communities from a first set of query communities to query communities from a second set of query communities.

FIG. 4 is an operational flow of an implementation of a method 400 for determining a set of mappings of query communities from the first set of query communities to query communities from the second set of query communities. The method 400 is an example of a co-occurrence method. The method 400 may be implemented by the community mapper 230 of the recommender 150, for example.

A unique query community pair is selected from the first set of query communities and the second set of query communities at 401. The unique query may be selected by the community mapper 230 of the recommender 150. The method 400 may be performed on each unique query community pair from the first set of query communities and the second set of query communities (e.g., the non-commercial query community data 223 and the commercial query community data 222).

A first amount of users who provided the selected query from the query community from the first set of query communities followed by the selected query from the query community from the second set of query communities is determined at 403. The determination may be made by the community mapper 230 of the recommender 150 using the query data 135 and the commercial query community data 222 and the non-commercial query community data 223.

A second amount of users who provided the selected query from the query community from the second set of query communities followed by the selected query from the query community from the first set of query communities is determined at 405. The determination may be made by the community mapper 230 of the recommender 150 using the query data 135 and the commercial query community data 222 and the non-commercial query community data 223.

A determination is made as to whether the first amount is both greater than the second amount and a threshold amount at 407. The determination may be made by the community mapper 230 of the recommender 150. The comparison to the threshold amount is optional and may be set by a user or administrator to increase the number of users who submitted both queries from the query communities for a mapping to be generated. If the first amount is both greater than the second amount and the threshold amount, then the method 400 may continue at 409 where a mapping is added to the set of mappings. Otherwise, the method 400 may return to 401 and select a new query community pair.

A mapping is added to the set of mappings from the query community from the first set of query communities to the query community from the second set of query communities at 409. The mapping may be added by the community mapper 230 to the community mapping 233. After adding the mapping, the method 400 may return to 401 and select a new query community pair.

Figure 5:
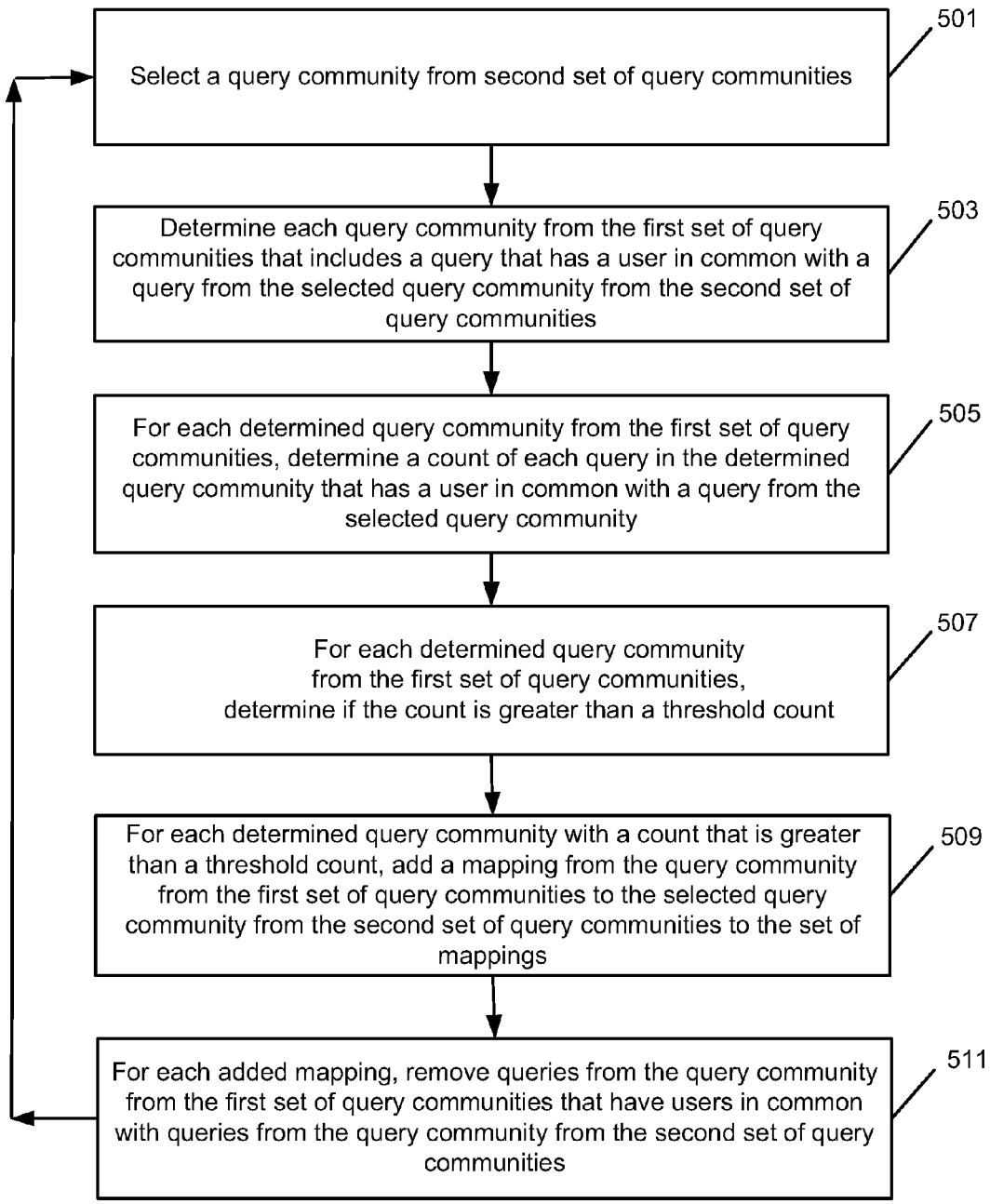
FIG. 5 is an operational flow of another implementation of a method for determining a set of mappings of query communities from a first set of query communities to query communities from a second set of query communities.

FIG. 5 is an operational flow of an implementation of a method 500 for determining a set of mappings of query communities from the first set of query communities to query communities from the second set of query communities. The method 500 is an example of a hitting set recommendation method. The method 500 may be implemented by the community mapper 230 of the recommender 150.

A query community is selected from the second set of query communities at 501. The query community may be selected by the community mapper 230 of the recommender 150.

Each query community from the first set of query communities that includes a query that has a user in common with a query from the selected query community from the second set of query communities is determined at 503. The determination may be made by the community mapper 230 of the recommender 150.

For each determined query community from the first set of query communities, a count is determined of each query in the determined query community that has a user in common with a query from the selected query community from the second set of query communities at 505. The determinations may be made by the community mapper 230 of the recommender 150.

A determination is made for each determined query community from the first set of query communities as to whether the determined count for that community is greater than a threshold count at 507. The determinations may be made by the community mapper 230 of the recommender 150.

For each determined query community from the set of query communities with a count that is greater than the threshold count, a mapping is added from the query community from the first set of query communities to the selected query community from the second set of query communities at 509. The mapping may be added by the community mapper 230 of the recommender 150 to the community mapping 233.

Queries from the query community from the first set of query communities that have users in common with queries from the query community from the second set of query communities may be removed from the first set of query communities for each added mapping at 511. The queries may be removed by the community mapper 230 of the recommender 150. The method 500 may then return to 501 where a new query community from the second set of query communities is selected. The method 500 may continue until all query communities from the second set of query communities have been considered.

Figure 6:
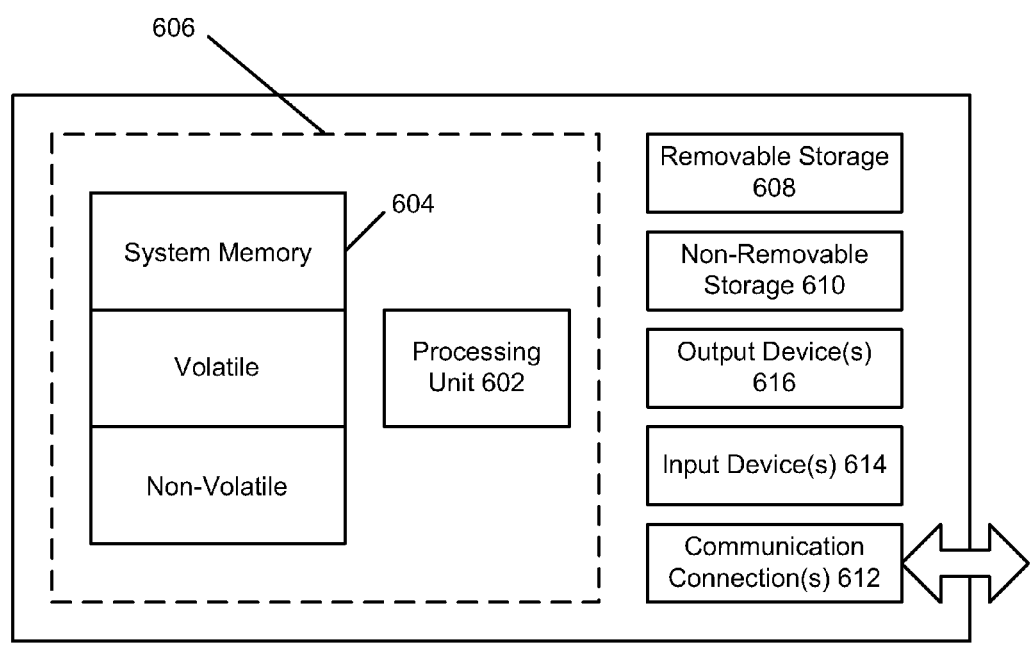
FIG. 6 is a block diagram of a computing system environment according to an implementation of the present system.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by computing device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving a set of queries at a computing device, wherein each query is associated with a user who provided the query and each query has an associated time;
    dividing the received set of queries into a set of queries that are commercial queries and a set of queries that are non-commercial queries, by the computing device;
    generating a first set of query communities from the set of queries that are non-commercial queries and a second set of query communities from the set of queries that are commercial queries by the computing device, wherein each query community comprises a plurality of queries of the set of queries and each query in a query community is related to each other query in the query community, wherein a first query is related to a second query if the first query and the second query were provided by the same user with associated times that are within a time window more than a threshold number of times;
    determining a set of mappings of query communities from the first set of query communities to query communities from the second set of query communities by the computing device according to the users and times associated with the queries in the query communities;
    receiving a query from the first set of query communities at the computing device; and
    recommending one or more queries from the second set of query communities using the received query and the set of mappings.

2. The method of claim 1, further comprising receiving a product taxonomy and generating the second set of query communities from the set of commercial queries based on the product taxonomy.

3. The method of claim 1, wherein each community in the second set of query communities corresponds to a product category.

4. The method of claim 1, wherein generating the first set of query communities from the set of queries comprises:
    generating a graph with a vertex for each unique query from the set of queries;

for each pair of vertices in the graph, generating an edge between the vertices if the queries associated with each vertex in the pair are related;

for each pair of vertices in the graph, generating an edge between the vertices if each vertex has more than a threshold number of neighbor vertices in common;

generating one or more clusters from the vertices in the graph, wherein each cluster comprises one or more vertices from the graph; and generating the first set of query communities from the clusters, wherein each query community corresponds to a cluster and includes each query associated with a vertex from the cluster.

5. The method of claim 4, further comprising determining if the queries associated with each vertex in the pair are related using one of a co-occurrence method, a hitting set method, or a random walk method.

6. The method of claim 1, wherein determining the set of mappings of query communities from the first set of query communities to query communities from the second set of query communities comprises, for each unique pair of query communities comprising a query community from the first set of query communities and a query community from the second set of query communities:

determining, from the set of queries, a first amount of users who provided a query from the query community from the first set of query communities followed by a query from the query community from the second set of query communities;

determining, from the set of queries, a second amount of users who provided a query from the query community from the second set of query communities followed by a query from the query community from the first set of query communities; and if the first amount is greater than a threshold amount, and the first amount is greater than the second amount, adding a mapping from the query community from the first set of query communities to the query community from the second set of query communities to the set of mappings.

7. The method of claim 1, wherein determining the set of mappings of query communities from the first set of query communities to query communities from the second set of query communities comprises:

for each query community in the second set of query communities:

determining each query community from the first set of query communities that includes a query that has a user in common with a query from the query community from the second set of query communities;

for each determined query community from the first set of query communities, determining a count of each query in the determined query community that has a user in common with a query from the query community from the second set of query communities;

for each determined query community from the first set of query communities, if the determined count is greater than a threshold count, adding a mapping from the query community from the first set of query communities to the query community from the second set of query communities to the set of mappings; and for each added mapping, removing queries from the query community from the first set of query communities that have users in common with queries from the query community from the second set of query communities.

8. The method of claim 1, further comprising training a classifier using a set of known commercial queries and a set of known non-commercial queries, and dividing the received set of queries into the set of queries that are commercial queries and the set of queries that are non-commercial queries using the classifier.

9. A system comprising:

at least one computing device; and a recommender adapted to:

receive a set of queries, wherein each query is associated with a user who provided the query and each query has an associated time;

divide the received set of queries into a set of queries that are commercial queries and a set of queries that are non-commercial queries;

generate a first set of query communities from the set of queries that are non-commercial queries and a second set of query communities from the set of queries that are commercial queries, wherein each query community comprises a plurality of queries of the set of queries and each query in a query community is related to each other query in the query community, wherein a first query is related to a second query if the first query and the second query were provided by the same user with associated times that are within a time window more than a threshold number of times;

determine a set of mappings of query communities from the first set of query communities to query communities from the second set of query communities according to the users and times associated with the queries in the query communities;

receive a query from the first set of query communities; and recommend one or more queries from the second set of query communities using the received query and the set of mappings.

10. The system of claim 9, wherein the recommender is further adapted to receive a product taxonomy and generate the second set of query communities from the set of commercial queries based on the product taxonomy.

11. The system of claim 9, wherein each community in the second set of query communities corresponds to a product category.

12. The system of claim 9, wherein the recommender adapted to generate the first set of query communities from the set of queries comprises the recommender adapted to:

generate a graph with a vertex for each unique query from the set of queries;

for each pair of vertices in the graph, generate an edge between the vertices if the queries associated with each vertex in the pair are related;

for each pair of vertices in the graph, generate an edge between the vertices if each vertex has more than a threshold number of neighbor vertices in common;

generate one or more clusters from the vertices in the graph, wherein each cluster comprises one or more vertices from the graph; and generate the first set of query communities from the clusters, wherein each query community corresponds to a cluster and includes each query associated with a vertex from the cluster.

13. The system of claim 12, wherein the recommender is further adapted to determine if the queries associated with each vertex in the pair are related using one of a co-occurrence method, a hitting set method, or a random walk method.

14. The system of claim 9, wherein the recommender adapted to determine the set of mappings of query communities from the first set of query communities to query communities from the second set of query communities comprises, for each unique pair of query communities comprising a query community from the first set of query communities and a query community from the second set of query communities, the recommender adapted to:
  determine, from the set of queries, a first amount of users who provided a query from the query community from the first set of query communities followed by a query from the query community from the second set of query communities;
  determine, from the set of queries, a second amount of users who provided a query from the query community from the second set of query communities followed by a query from the query community from the first set of query communities; and
  if the first amount is greater than a threshold amount, and the first amount is greater than the second amount, add a mapping from the query community from the first set of query communities to the query community from the second set of query communities to the set of mappings.

15. The system of claim 9, wherein the recommender adapted to determine the set of mappings of query communities from the first set of query communities to query communities from the second set of query communities comprises the recommender adapted to:
  for each query community in the second set of query communities:
    determine each query community from the first set of query communities that includes a query that has a user in common with a query from the query community from the second set of query communities;
    for each determined query community from the first set of query communities, determine a count of each query in the determined query community that has a user in common with a query from the query community from the second set of query communities;
    for each determined query community from the first set of query communities, if the determined count is greater than a threshold count, add a mapping from the query community from the first set of query communities to the query community from the second set of query communities to the set of mappings; and
    for each added mapping, remove queries from the query community from the first set of query communities that have users in common with queries from the query community from the second set of query communities.

16. A method comprising:
receiving a set of queries at a computing device, wherein each query is associated with a user who provided the query and each query has an associated time;
generating a first set of query communities from the set of queries and a second set of query communities from the set of queries by the computing device, wherein each query community comprises a plurality of queries of the set of queries and each query in a query community is related to each other query in the query community; and
determining a set of mappings of query communities from the first set of query communities to query communities from the second set of query communities by the computing device according to the users and times associated with the queries in the query communities,
wherein generating the first set of query communities comprises:
  generating a graph with a vertex for each unique query from the set of queries;
  for each pair of vertices in the graph, generating an edge between the vertices if the queries associated with each vertex in the pair are related, wherein the queries are related if the queries were provided by the same user with associated times that are within a time window more than a threshold number of times;
  generating one or more clusters from the vertices in the graph, wherein each cluster comprises one or more vertices from the graph; and
  generating the first set of query communities from the clusters, wherein each query community corresponds to a cluster and includes each query associated with a vertex from the cluster.

17. The method of claim 16, further comprising for each pair of vertices in the graph, generating an edge between the vertices if each vertex has more than a threshold number of neighbor vertices in common.

\* \* \* \* \*